June 8, 1965  M. V. HERBERT ETAL  3,187,504
CONTROL SYSTEMS FOR AIRCRAFT GAS TURBINE ENGINES
Filed Dec. 27, 1962  6 Sheets-Sheet 1

FIG. 1.

Michael V. Herbert
William G. E. Lewis
John B. McGarry
Inventors

Michael V. Herbert
William G. E. Lewis
John B. McGarry
*Inventors*

Michael V. Herbert
William G. E. Lewis
John B. McGarry
Inventors

United States Patent Office 3,187,504
Patented June 8, 1965

3,187,504
CONTROL SYSTEMS FOR AIRCRAFT GAS TURBINE ENGINES
Michael Vaughan Herbert, Fleet, William Gerald Eric Lewis, Farnborough, and John Brian McGarry, Church Crookham, near Aldershot, England, assignors to Power Jets (Research and Development) Limited, London, England, a British company
Filed Dec. 27, 1962, Ser. No. 247,748
Claims priority, application Great Britain, Jan. 22, 1959, 2,380/59
3 Claims. (Cl. 60—35.6)

The present application is a continuation-in-part of application Serial No. 4,027, filed January 22, 1960, now abandoned, in the names of the present applicants.

This invention relates to the control of gas turbine jet propulsion engines of the type having a reheat combustion system or afterburner for the combustion of reheat fuel. The invention is specifically concerned with engines intended for operation under conditions of supersonic flow at the air intake with the reheat system in continuous use, though provision may be made for an optional non-reheat phase of operation.

In all gas turbines designed for the jet propulsion of aircraft, it is a requirement that the engine shall be matched to the air intake, and this requirement is of particular significance in the case of engines designed for supersonic flight conditions over a fairly wide range of speed and altitude. Thus in general, the intake configuration must be varied to allow for the varying flight speed. Moreover the intake, when in any given configuration, will be matched to a particular mass flow, and it can accept with stability only a narrow range of flows differing from the flow for which the intake is designed.

It follows therefore that the usual method of control of a gas turbine jet propulsion engine, which involves varying the propulsive thrust by varying the fuel supply and hence the rotational speed of and the mass flow through the engine, is not readily applicable to engines intended for supersonic operation under the conditions indicated above. The use of such a method would require a control system in which the intake configuration is related not only to the flight speed but also to various operating conditions of the engine, and the complication involved would be considerable.

It is an object of the present invention to provide a method of control of a gas turbine jet propulsion engine of the type referred to in which variations of the propulsive thrust at a given flight speed have the minimum effect on the intake air mass flow. Thus it should be possible substantially to separate the control of the intake configuration from the control of the engine itself, so that the problems of engine/intake matching are simplified. A further object is the provision of a control system for effecting the method of control aforesaid.

The invention accordingly provides a method of controlling a gas turbine jet propulsion engine of the single spool type having a main combustion system and a reheat combustion system under supersonic flight conditions wherein the propulsive thrust of the engine is varied by manually varying the fuel supply to one combustion system while the engine rotational speed is maintained substantially constant over at least a part of the engine operating range by varying the fuel supply to the other combustion system, and the jet nozzle area is maintained constant.

The invention further provides a control system for a gas turbine jet propulsion engine of the single spool type having a main combustion system and a reheat combustion system comprising a control for varying the fuel supply to one combustion system so as to vary the propulsive thrust of the engine and governing means for automatically varying the fuel supply to the other combustion system so as to maintain the engine rotational speed substantially constant at a reference value.

In a preferred form of the invention, the propulsive thrust is varied by varying the fuel supply to the main combustion system while the engine rotational speed is maintained substantially constant by varying the fuel supply to the reheat combustion system.

According to a feature of the invention, at relatively low values of compressor inlet temperature $T_1$, the engine rotational speed N is controlled so that the parameter $$\frac{N}{\sqrt{T_1}}$$

is maintained substantially constant.

Two embodiments of the invention will now be described by way of example with reference to the accompanying drawings, in which.

Figure 1:
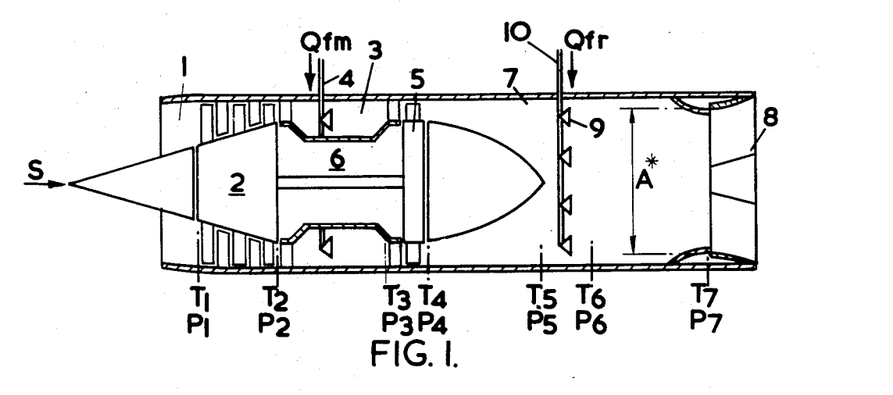
FIGURE 1 is a schematic view of an aircraft gas turbine jet propulsion engine of the reheat type, indicating the engine temperature and pressure values.

In FIGURE 1, the gas turbine engine shown comprises an air intake 1 of variable configuration designed to accept with stability an air flow entering the intake at supersonic velocity in the direction of arrow S, an axial flow compressor 2, a main combustion system 3 supplied with fuel by fuel pipe 4, an axial flow turbine 5 drivingly connected to the compressor 2 by a shaft 6 and an exhaust duct 7 leading to a convergent-divergent jet propulsion nozzle 8 designed for operation under supersonic flight conditions. Within the exhaust duct 7, a reheat combustion system is provided by a reheat burner 9, and reheat fuel is supplied to the reheat burner by fuel supply pipe 10. Both the fuel supplies to the main combustion system 3 and to the reheat combustion system are controllable. Provision is made for varying the throat area $A^*$ of the jet propulsion nozzle 8.

The letters T and P in FIGURE 1 indicate absolute total head temperature and pressure respectively while the numerical suffixes associated with these letters indicate the different stations along the engine, as follows:

(1) Compressor inlet
(2) Compressor outlet
(3) Turbine nozzle inlet
(4) Turbine outlet
(5) Reheat combustion system inlet
(6) Reheat combustion system outlet
(7) Jet nozzle throat.

Symbols $\Delta T_{1,2}$; $\Delta T_{3,4}$ are employed herein to denote temperature rise in the compressor and temperature fall in the turbine respectively, while Q, $Q_{fm}$ and $Q_{fr}$ respectively represent the engine air mass flow, the quantity of fuel supplied to the main combustion system and the quantity of fuel supplied to the reheat combustion system.

In operation under supersonic flight conditions air enters into intake 1 and passes into the compressor 2 at temperature of $T_1$ and a pressure $P_1$. After compression the air at a temperature $T_2$ and pressure $P_2$ enters the main combustion chamber 3 to which fuel is supplied at a flow of $Q_{fm}$ through pipe 4. The combustion products enter turbine 5 at a temperature and pressure of $T_3$, $P_3$ respectively and are expanded down to a pressure $P_4$ at a temperature $T_4$ whence they enter the reheat chamber at $P_5$ and $T_5$. Reheat fuel supply at a flow of $Q_{fr}$ is supplied to the reheat burner 9 through pipe 10 and the reheated gases enter the propulsion nozzle at a temperature $T_6$ and a pressure $P_6$ and thence pass through the nozzle 8 providing a propulsive thrust. Under the operating conditions contemplated, the turbine nozzle and the jet propulsion nozzle 8 will be choked.

Figure 2:
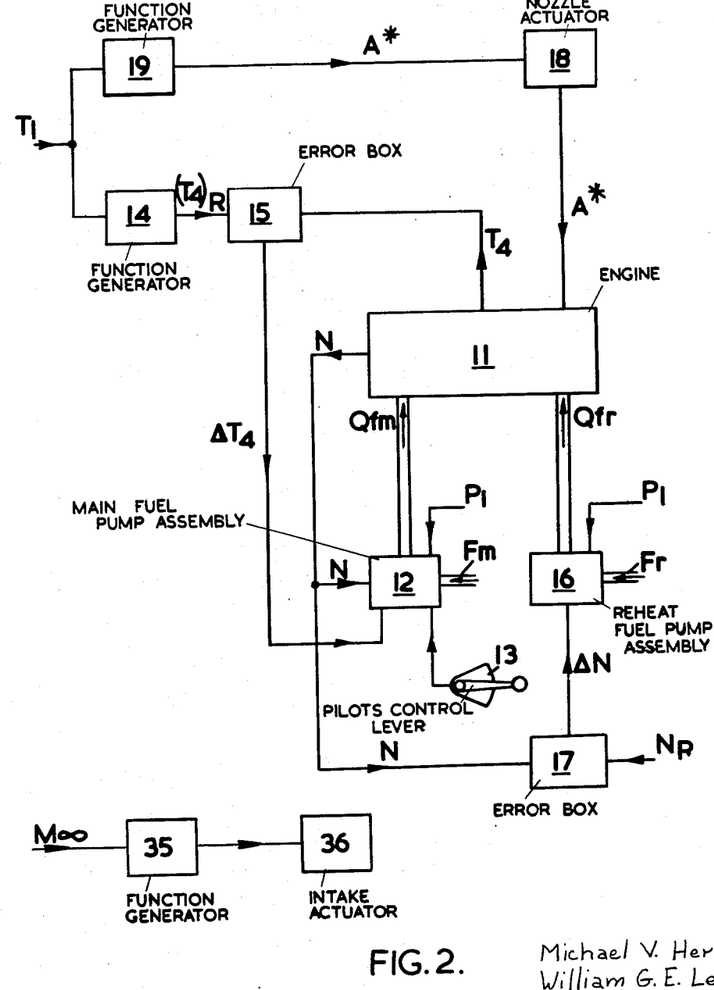
FIGURE 2 is a diagram showing a control system for the engine of FIGURE 1, flow lines carrying operating signals being shown in single lines and flow lines carrying fuel being shown in double lines.

In the control system of FIGURE 2, the main combustion system of the engine 11 is supplied with a quantity of fuel $Q_{fm}$ by a fuel pump assembly 12. This pump assembly is supplied with low pressure fuel (as indicated by Fm) and may be driven by the engine at engine speed N or at a speed proportional thereto. A manually operated pilot's control lever 13 is connected to apply a signal to the pump assembly to vary the fuel supply $Q_{fm}$ and hence the engine propulsive thrust.

The pilot's control of the fuel supply $Q_{fm}$ is subject to a limit such that for any given value of compressor inlet temperature $T_1$, a limiting maximum value of turbine outlet temperature $T_4$ is not exceeded so that engine surge and overheating is avoided. A signal proportional to $T_1$ is applied to a function generator 14, the output signal $(T_4)_R$ of which is proportional to the required limiting value of $T_4$. This reference signal is compared in error box 15 with a signal proportional to the immediate value of $T_4$, and should $T_4$ exceed $(T_4)_R$, the error signal $\Delta T_4$ is applied to the pump assembly 12 to limit the fuel flow $Q_{fm}$. The nature of the variation of $(T_4)_R$ with $T_1$ is discussed below. In an alternative embodiment the limitation is imposed on $T_3$ rather than $T_4$.

The reheat combustion system of the engine 11 is supplied with a quantity of fuel $Q_{fr}$ by a second fuel pump assembly 16. The pump is supplied with low pressure fuel (as indicated by $F_r$) and may be driven at a speed independent of engine speed N. A signal proportional to engine rotational speed N is applied to an error box 17 to which is also applied a reference signal $N_R$ proportional to the rotational speed at which it is desired to govern the engine. In the error box 17 the two signals are compared and any error, $\Delta N$, is applied to vary correctively the delivery of the pump 16 to reduce the error and bring the signals into equality. The correction is such that for a positive $\Delta N$ signal (i.e. N greater than $N_R$) the rate of fuel supply is increased, and vice versa.

It will be seen therefore that while the propulsive thrust of the engine is varied by varying the rate of the fuel supply to the main combustion system by means of a pilot operated open loop control system, the engine rotational speed is maintained constant at a reference value by variation of the fuel supply to the reheat combustion system through an independent closed loop control system. Moreover the thrust variation is obtained with a fixed value of nozzle throat area $A^*$ for a given flight condition, i.e. at a particular flight speed and altitude. This may be explained as follows. Considering first the main combustion system and the jet nozzle only, i.e. assuming constant reheat fuel supply, an increase in the main fuel supply, to increase the propulsive thrust requires a reduction of jet nozzle area if engine rotational speed is to be maintained constant. On the other hand, with constant fuel supply to the main combustion system, an increase in supply of reheat fuel requires an increase of jet nozzle area for constant speed. In the system here described, the main and reheat fuel supplies are varied together in the same sense to maintain constant rotational speed (as will be explained in more detail below). The simultaneous increases or decreases of the two fuel supplies require opposite variations of jet nozzle area, and the result is that the nozzle area can be left unaltered.

A signal proportional to compressor inlet pressure $P_1$ may also be applied to the pump assemblies 12 and 16 to vary the quantities of fuel delivered to the engine in response to changes of altitude.

In some applications of the invention, the nozzle throat area $A^*$ may be maintained constant for all flight conditions, but in the present embodiment the throat area $A^*$ of the nozzle 8 is continuously variable in accordance with $T_1$ by means of a nozzle actuator 18. A signal proportional to $T_1$ is applied to a function generator 19, the output signal of which is applied to the nozzle actuator to give the required variation of $A^*$. The nature of the variation is discussed below.

Figure 3:
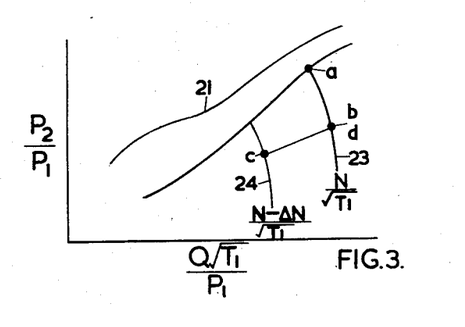
FIGURES 3 and 4 are engine characteristic diagrams showing the transient conditions obtaining during thrust variations.

Transient operating conditions which occur on a reduction of thrust at a constant flight Mach No. will now be described with reference to FIGURE 3 which is an engine characteristic diagram showing compressor pressure ratio $P_2/P_1$ plotted against non-dimensional mass flow $$\frac{Q\sqrt{T_1}}{P_1}$$

The line 21 is the compressor surge line.

If the engine operating is $a$ on the line 22 and on constant $$\frac{N}{\sqrt{T_1}}$$

line 23, and a reduction of thrust is required, the pilot initiates a signal to reduce the main fuel supply $Q_{fm}$. Before the engine speed N can decrease and with the nozzle area $A^*$ fixed with the value of $T_1$, the temperatures $T_3$, $T_4$, $T_5$ and $T_6$ fall. Since, under choked conditions and with constant area turbine nozzles, $P_3$ is proportional to $\sqrt{T_3}$, $P_2$, which may be considered in fixed relationship to $P_3$, falls, so that the compressor or pressure ratio $P_2/P_1$ falls also and the operating point moves to point $b$ on the same $$\frac{N}{\sqrt{T}}$$

line 23. The reheat fuel supply $Q_{fr}$ is momentarily unchanged so that the temperature drop across the turbine, $\Delta T_{3,4}$, falls whereas that across the compressor, $\Delta T_{1,2}$, remains approximately constant with the engine speed N, so that there is an out-of-balance torque tending to reduce engine speed from N to $N-\Delta N$.

This involves a movement of the operating point from $b$ to $c$ on a new $$\frac{N-\Delta N}{\sqrt{T_1}}$$

line 24, where $N-\Delta N$ is the new speed. Point $c$ would constitute a new equilibrium operating point but, at this point, the N signal applied to the pump 16 effects a reduction in re-heat fuel flow $Q_{fr}$. Upon a reduction of reheat fuel supply, temperature $T_6$ at nozzle entry falls whilst $T_3$ and $P_3$ at the turbine inlet remain constant momentarily. Since $A^*$ is also fixed and, under the choked conditions, $P_6$ is proportional to $\sqrt{T_6}$, the pressure $P_6$ falls with the reduction of $T_6$ and the turbine pressure ratio $P_3/P_4$ increases whilst the compressor ratio $P_2/P_1$ remains unchanged. Hence, the engine speed tends to increase again and engine operating point moves back to point $d$, substantially co-incident with point $b$.

Figure 4:
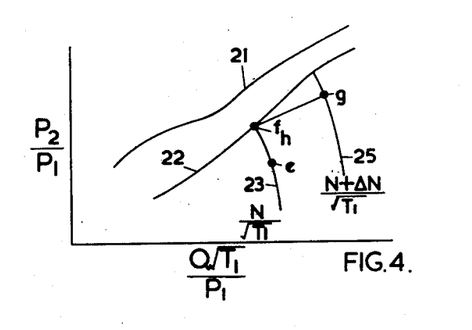

The transient conditions obtaining on an increase in thrust are indicated in the engine characteristic diagram of FIGURE 4. At pont $e$ the main fuel supply $Q_{fm}$ is increased and temperatures $T_3$, $T_4$, $T_5$ and $T_6$ rise. Since, under choking conditions at the jet nozzle, $P_3$ is proportional to $\sqrt{T_3}$ and $P_3$ is in fixed relationship to $P_2$, the compressor pressure ratio $P_2/P_1$ increases. The operating point moves from the point $e$ to point $f$ on the same $$\frac{N}{\sqrt{T_1}}$$

line 23. Reheat fuel flow remains unchanged since engine speed is unchanged and the temperature drop, $\Delta T_{3,4}$, across the turbine increases. The temperature rise across the compressor, $\Delta T_{1,2}$, remains constant with engine speed so that there is an out-of-balance torque tending to increase engine speed and the running point moves to point $g$ on a new $$\frac{N+\Delta N}{\sqrt{T_1}}$$

line 25. This speed change initiates a positive $\Delta N$ signal and when this is applied to the reheat fuel pump 16 the flow $Q_{fr}$ is increased. This results in an increase in $T_6$ and since $P_6$ is proportional $\sqrt{T_6}$, $P_6$ also increases so reducing the turbine pressure ratio $P_3/P_4$. On the consequential fall in engine speed the operating point moves back to point $h$ on the same $$\frac{N}{\sqrt{T_1}}$$

line as point $e$. Engine speed has thus been governed to a set value while the increased $T_6$ value gives increased thrust.

It will be seen therefore that on a thrust increase or decrease at constant flight speed, the engine operating point remains (apart from a transient disturbance) on a curve 23 corresponding to a constant value of $$\frac{N}{\sqrt{T_1}}$$

$N$ being maintained constant by the control system and $T_1$ being constant at constant flight Mach No. Now the part of a constant $$\frac{N}{\sqrt{T_1}}$$

curve corresponding to a useful operating range, i.e. a range with an adequate stall margin, is not far off vertical, and so during the thrust charge the corrected or non-dimensional mass flow $$\frac{Q\sqrt{T_1}}{P_1}$$

remains practically unaltered. Further, since at a constant flight Mach No. compressor inlet temperature $T_1$ and pressure $P_1$ remain unchanged, the actual engine mass flow is unaltered. Hence if the intake configuration is initially matched to the engine operating conditions, no variation of configuration is required to maintain the matching after a thrust charge or at any rate the variation can be of a minor nature only to allow for the transient conditions described above.

Figure 5:
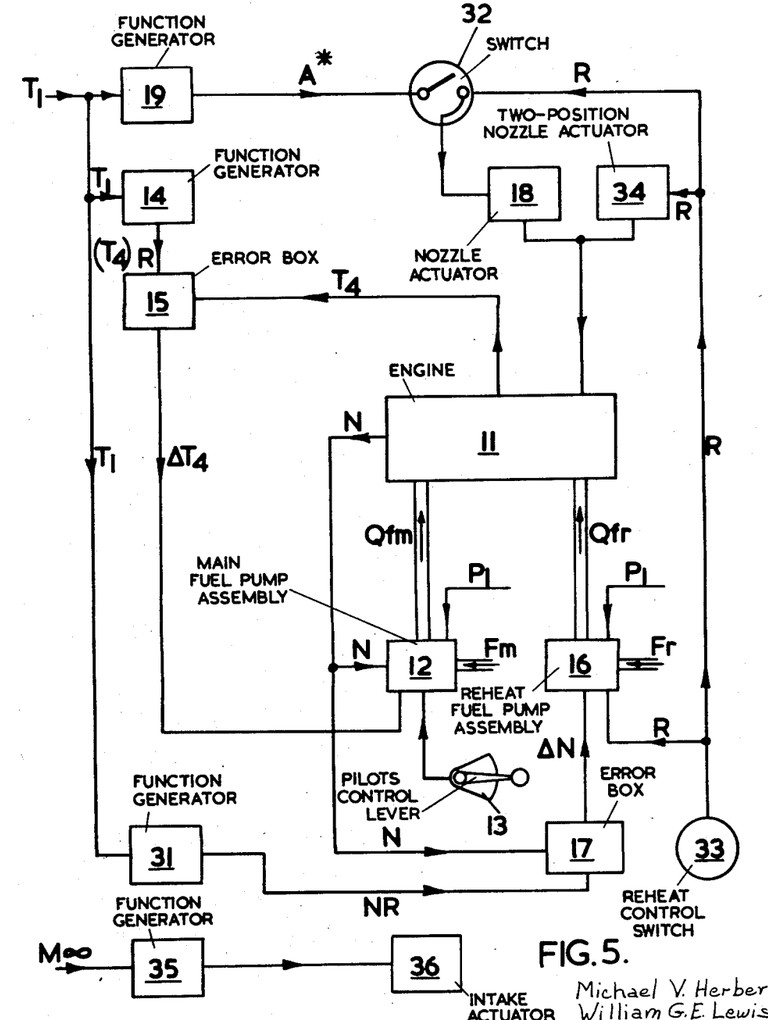
FIGURE 5 is a diagram showing a modified form of the control system of FIGURE 2.

In some applications of the invention, it may be desirable when in flight at low speeds and at high altitudes, i.e. at relatively low values of $T_1$, to maintain the parameter $$\frac{N}{\sqrt{T_1}}$$

substantially constant and allow $N$ to vary. Control in this manner is afforded by the control system of FIGURE 5 in which components corresponding to those of FIGURE 2 are designated by the same reference numerals. In this embodiment, a signal proportional to $T_1$ is fed into function generator 31 and the output thereof constitutes the reference signal $N_R$ supplied to the error box 17, the signal varying with $T_1$ over the lower part of the range of the latter.

Figure 6:
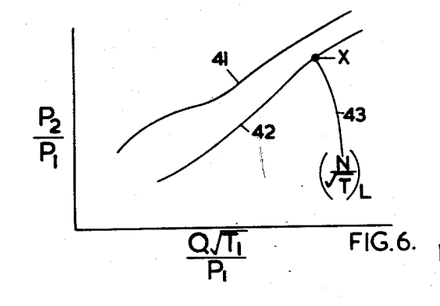
FIGURE 6 is an engine characteristic diagram showing the operating conditions of the system of FIGURE 5.

The mode of operation of the system of FIGURE 5 may be understood by reference to FIGURE 6 which is an engine characteristic diagram analogous to those of FIGURES 3 and 4. The surge line is indicated at 41 and the engine operating limit line at 42. The engine is operated along line 42 up to the point X which corresponds to a limiting maximum value of $$\frac{N}{\sqrt{T_1}}$$

the output signal of function generator 31 being constant and proportional to the required constant rotational speed at which the engine is to be governed. At values of $$\frac{N}{\sqrt{T_1}}$$

beyond the limiting value $$\left(\frac{N}{\sqrt{T_1}}\right)_L$$

represented by line 43 that is, at relatively low values of $T_1$, the output signal from function generator 31 is altered so that it varies with $T_1$ in such a way that engine speed $N$ is varied to maintain the parameter $$\frac{N}{\sqrt{T_1}}$$

constant at the required limiting value $$\left(\frac{N}{\sqrt{T_1}}\right)_L$$

In this way the possibility of engine surge and overheating may be avoided.

It is contemplated that the engine described herein will be operated with continuous reheat when in flight at supersonic speeds, but provision is made for operating without reheat under certain conditions, e.g. running up on the ground, taxiing, and low altitude subsonic flight. Under these conditions the reheat fuel supply is discontinued and the thrust controlled by variation of the main fuel supply only.

A switch 32 is opened to disconnect the nozzle actuator 18 from function generator 19 and the jet nozzle throat area is fixed at a suitable value independent of $T_1$. It is assumed that a pilot burner remains alight in the reheat combustion system. When operation with reheat is required a reheat control switch 33 is closed whereby a signal R is transmitted to fuel pump assembly 16 to initiate the supply of fuel to the reheat combustion system. This fuel is ignited by the pilot burner. At the same time the signal R is transmitted to a two-position nozzle actuator 34 so that the nozzle throat area $A^*$ is increased to a pre-set value—the minimum for operation with reheat. Finally the signal R operates a relay which closes switch 32 so that the actuator 18 is brought into operation to vary the nozzle area in accordance with the value of $T_1$.

Arrangements for initiating reheat operation may be embodied in the arrangement of FIGURE 2 in a corresponding manner.

FIGURES 2 and 5 also show a further function generator 35 to which is fed a signal proportional to flight Mach No. $M\infty$ and which generates a signal which is supplied to the mechanism controlling the configuration of the intake 36, so that its configuration, e.g. its intake area/throat area ratio or opening of spill ports, is matched to $M\infty$. The intake control is quite separate from the engine control, since the matching of the intake is required to cater for only a limited departure from critical flow conditions arising from transients as described with reference to FIGURES 3 and 4 above. It will of course be understood that $T_1$ and $P_1$ change with flight Mach No. so that there is a corresponding change of engine mass flow, but as $T_1$ and $P_1$ are associated with flight Mach No., these variations can be allowed for in the schedule of engine configuration with flight Mach No.

Figure 7:
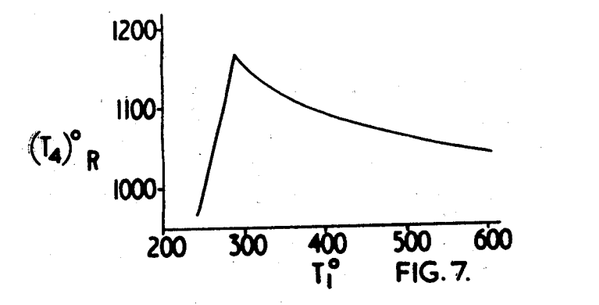
FIGURES 7, 8 and 9 are graphs illustrative of the variation of maximum turbine outlet temperature, jet nozzle area and engine speed obtaining in a typical embodiment of the invention.

The limit imposed by function generator 14 on the main fuel supply will depend upon the particular engine and its intended application. An illustrative example of the required variation is shown in the graph of FIGURE 7 in which $(T_4)_R$ (which corresponds to the maximum value of $T_4$) is plotted against $T_1$ (both absolute temperatures). $(T_4)_R$ thus decreases with values of $T_1$ increasing from the take-off value (here taken at 288° K. or 15° C.). Below the take-off value $(T_4)_R$ decreases with $T_1$.

Figure 8:
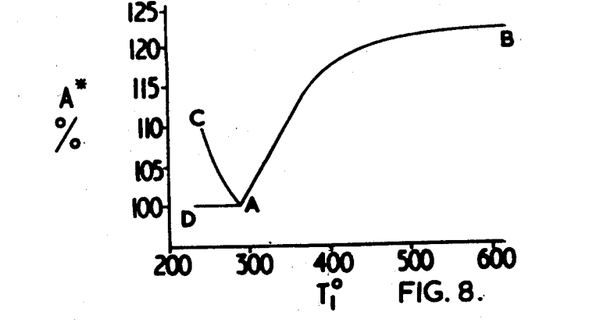

FIGURE 8 shows the corresponding variation of jet nozzle area $A^*$ with $T_1$ as determined by function generator 19, $A^*$ (shown as a percentage) being plotted against absolute temperature $T_1$. The curve AB represents the variation applicable in the temperature range from take-off value upwards and it will be seen that $A^*$ increases with $T_1$ but at a decreasing rate. If, as in the embodiment of FIGURE 2

$$\frac{N}{\sqrt{T_1}}$$

is allowed to increase beyond the take-off value, i.e. the engine is governed at constant rotational speed N throughout its operating range, the value of $A^*$ at low temperatures is represented by curve AC, the increase of nozzle area with decreasing temperature being necessary to avoid surge. On the other hand, if $$\frac{N}{\sqrt{T_1}}$$

is limited to the take-off value as in FIGURE 5, $A^*$ can be held constant at temperatures below the take-off value as indicated by curve AD.

Figure 9:
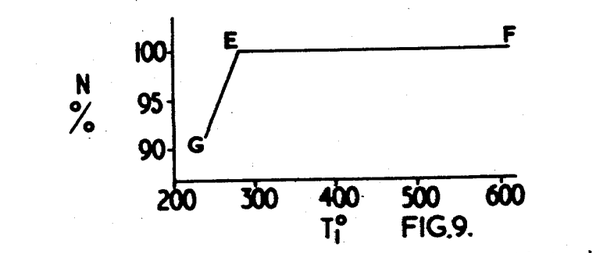

FIGURE 9 shows, again by way of example, the variation of engine rotational speed N (shown as a percentage) arising from the variation of the output signal $N_R$ of the function generator 31 of FIGURE 5. For values of $T_1$ above the take-off value, the signal is constant and so engine speed N is maintained at a constant value as indicated by curve EF. For lower values of $T_1$, engine speed may be varied in accordance with curve EG, so that $$\frac{N}{\sqrt{T_1}}$$

is maintained constant.

The signals in the lines indicated in the diagrams of FIGURES 2 and 5 may be electrical, pneumatic or hydraulic, the former in many cases being the most convenient. Thus the immediate values of $T_1$ and $T_4$ (or $T_3$) may be detected by thermocouples and the amplified output thereof supplied to the function generators which may be non-linear potentiometers designed to generate electrical signals such that required relationships between $T_1$ and $T_4$, $A^*$ and N, e.g. those indicated in the graphs of FIGURES 7, 8 and 9, are maintained. The engine 11 drives a generator whereby an E.M.F. proportional to engine rotational speed N is applied to error box 17 to constitute the N signal, while in FIGURE 2 the $N_R$ signal is supplied by a source of constant E.M.F.

The nozzle actuators 18, 34 may be operated by electric motors which are set in motion by the electrical signal from function generator 19 and by the electrical signal initiated by closing the reheat switch 33. The variable area nozzle may be of any known construction, one suitable arrangement being described in United States Patent No. 2,930,186.

Figure 10:
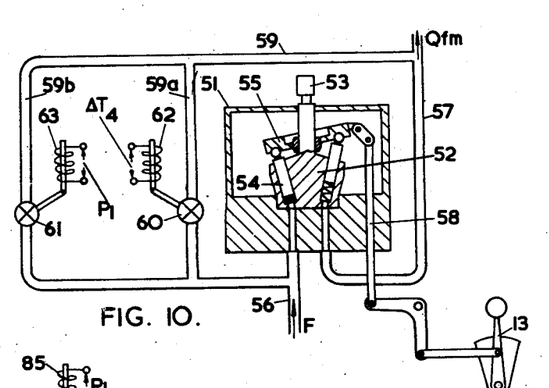
FIGURES 10 and 11 show diagrammatically possible arrangements of the main and reheat fuel supply systems.

One possible arrangement of the main fuel pump 12 and its associated controls is shown in FIGURE 10. The pump 51 itself is of the known variable stroke type having a rotor 52 mounted on a shaft 53 and a number of plungers 54 mounted in the rotor, the stroke of the plungers being varied by altering the setting of a swash plate 55. Low pressure fuel $F_m$ is delivered to the pump through conduit 56 and the pump delivers fuel to the main combustion system of the engine through conduit 57. The setting of the swash plate 55 and hence the rate of fuel supply $Q_{fm}$ to the engine is determined by a push rod 58 connected to pilot's control lever 13.

The fuel discharge conduit 57 is connected to the supply conduit 56 by a spill conduit 59 having parallel branches 59a, 59b with valves 60, 61. These valves are controlled by solenoids 62, 63, to one of which is applied the electrical $\Delta T_4$ signal from error box 15 and to the other of which is applied an electrical signal proportional to $P_1$, this signal being derived from a pressure-sensitive element at the compressor inlet. Thus should the maximum value of $T_4$ be exceeded, the engine fuel supply is reduced by the opening of the spill valve 60 while the supply is also varied in accordance with $P_1$ by the opening of the spill valve 61.

The shaft 53 of the pump is either directly driven by the engine 11 or is driven by a motor supplied by the generator supplying the N signal to the error box 17.

It will be understood that the $\Delta T_4$ and $P_1$ signals might alternatively be applied to vary the stroke of the pump, or in the case of a pump of fixed delivery, the pilot's control lever could be connected to vary the spill.

Figure 11:
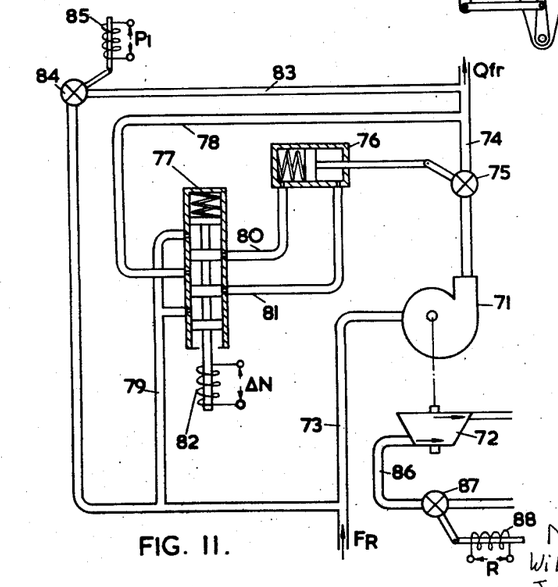

FIGURE 11 shows one possible arrangement of the reheat fuel pump 16 and its associated controls. The pump 71 itself is of the centrifugal type and is driven at substantially constant speed by an air turbine 72. The flow through this pump will be substantially independent of fuel delivery pressure. Low pressure fuel $F_r$ is supplied to the pump through conduit 73 and the fuel is delivered to the reheat combustion system of the engine through conduit 74. The rate of fuel supply $Q_{fr}$ is varied by means of a valve 75 in delivery conduit 74, and the setting of this valve is determined by a servo piston 76 controlled by a servo valve 77. High pressure fuel is led from delivery conduit 74 through conduit 78 to the servo valve for use as servo fluid, while drain conduit 79 leads from the servo valve back to the fuel supply conduit 73. The servo valve is connected to supply fluid to each side of the servo piston through conduits 80, 81.

The position of the servo valve is determined by a solenoid 82 to which is applied the $\Delta N$ signal from error box 17. Thus if $\Delta N$ is zero, the valve is in the null position shown, the servo piston and the valve 75 are held at a particular setting and a particular rate of fuel supply $Q_{fr}$ is maintained. A positive or negative $\Delta N$ signal moves the servo valve in an appropriate sense to permit flow of servo fluid in conduits 80, 81 so that the servo piston adjusts the setting of the valve 75 and varies the rate of fuel supply $Q_{fr}$ in a corrective sense to restore the engine speed to the required value, the servo valve then returning to its null position.

The fuel discharge conduit 74 is also connected to the conduit 73 through a spill conduit 83 and spill valve 84. This valve is controlled by a solenoid 85 to which is applied an electrical signal proportional to $P_1$, so that the fuel supply is varied in accordance with $P_1$.

The air turbine is supplied through pipe 86 and valve 87 with air bled off from the compressor 2 of the engine. The valve 87 is operated by a solenoid 88 to which is applied the electrical signal R initiated by closing the reheat switch 33. Thus closing the switch 33 opens the valve 87 so that the turbine 72 and pump 71 are set in motion and supply of fuel to the reheat combustion system is initiated.

In the above-described embodiments engine thrust is varied by variation of the main fuel supply while engine rotational speed is governed by variation of the reheat fuel supply. It would be possible to connect the pilot's control lever to vary the reheat fuel supply and to automatically govern the engine by variation of the main fuel supply. However the described arrangement is considered to be preferable as it facilitates the provision of an optional non-reheat phase of operation.

The control systems and methods of operation descibed herein are considered to be of particular application to a single spool engine such as that shown in FIGURE 1, but they are not necessarily applicable to a two spool, e.g. a double compound or a by-pass, gas turbine engine.

We claim:

1. A gas turbine jet propulsion engine of the single spool type comprising an air intake designed to receive an air flow at supersonic velocities, a compressor, a main combustion system, a turbine, a re-heat combustion system and a variable area jet nozzle designed for operation under supersonic flight conditions arranged sequentially in the direction of flow; fuel supplies to each of said combustion systems; an open loop control system comprising a first fuel control for varying one of said fuel supplies; a closed loop control system separate from said open loop control system and comprising a second fuel control for varying the other of said fuel supplies and governing means independent of said first fuel control and operable in response to engine rotational speed N to automatically adjust said second fuel control in a sense to maintain engine rotational speed substantially constant over at least part of the engine operating range; and a scheduling control system for said jet nozzle separate from said open and closed loop control systems and operable in response to compressor inlet temperature and independently of said first and second fuel controls and of said governing means to vary the jet nozzle area in the same sense as compressor inlet temperature over said part of the engine operating range.

2. A gas turbine jet propulsion engine of the single spool type comprising an air intake designed to receive an air flow at supersonic velocities, a compressor, a main combustion system, a turbine, a re-heat combustion system and a variable area jet nozzle designed for operation under supersonic conditions arranged sequentially in the direction of flow, fuel supplies to each of said combustion systems; an open loop control system comprising a first fuel control for varying one of said fuel supplies; a closed loop control system comprising a second fuel control for varying the other of said fuel supplies and governing means independent of said first fuel control and operable in response to engine rotational speed N and compressor inlet temperature $T_1$ to automatically adjust said second fuel control in a sense to maintain the parameter $$\frac{N}{\sqrt{T_1}}$$

substantially constant at relatively low values of $T_1$ and to maintain engine rotational speed N substantially constant at higher values of $T_1$; and a scheduling control system for said jet nozzle separate from said open and closed loop control systems and operable in response to compressor inlet temperature $T_1$ and independently of said first and second fuel controls and of said governing means to maintain the jet nozzle area constant at said low values of $T_1$ and to vary the jet nozzle area in the same sense as $T_1$ at said higher values of $T_1$.

3. A gas turbine jet propulsion engine of the single spool type comprising an air intake of variable configuration designed to receive an air flow at supersonic velocities, a compressor, a main combustion system, a turbine, a re-heat combustion system and a variable area jet nozzle designed for operation under supersonic flight conditions arranged sequentially in the direction of flow; a fuel supply to the main combustion system; an open loop control system comprising a fuel control for varying said main fuel supply; a fuel supply to the reheat combustion system; a closed loop control system separate from said open loop control system and comprising a fuel control for varying said reheat fuel supply, governing means independent of said first-mentioned fuel control and operable in response to any departure of engine rotational speed from a reference value to automatically adjust said reheat fuel control in a sense to maintain engine rotational speed constant over at least part of the engine operating range; an air intake control system separate from said open and closed loop control systems and operable to vary the total intake configuration only in accordance with flight Mach No. and independently of said fuel controls and governing means; and a control system for said jet nozzle separate from said open and closed loop control systems and operable only in response to compressor inlet temperature to vary the jet nozzle area independently of both of said fuel controls and said governing means.

References Cited by the Examiner

UNITED STATES PATENTS

| 2,699,524 | 1/55 | Jackson | 60—35.6 |
| 2,699,646 | 1/55 | Baker | 60—35.6 |
| 2,778,191 | 1/57 | Thompson | 60—35.6 |
| 2,911,033 | 11/59 | Eley | 60—39.28 |
| 2,933,887 | 4/60 | Davies | 60—35.6 |
| 2,984,969 | 5/61 | Torell | 60—35.6 |

OTHER REFERENCES

Simonis: "Training the Supersonic Turbojet," Aviation Age, vol. 29, No. 4, April 1958, pp. 60–69, Conover-Mast Publications Inc.

SAMUEL LEVINE, *Primary Examiner.*